3,359,227
PRODUCTION OF SHAPED POLYAMIDE STRUCTURES OF IMPROVED PROPERTIES USING AMIDES, SULFOXIDES OR SULFONES
Herbert Amann, Grossauheim, and Erich Bäder, Hanau am Main, Germany, assignors to Deutsche Gold- und Silber-Scheideanstalt vormals Roessler, Frankfurt am Main, Germany
No Drawing. Filed May 6, 1964, Ser. No. 365,522
Claims priority, application Germany, May 11, 1963, D 41,543
5 Claims. (Cl. 260—30.8)

The present invention relates to an improved process for the direct production of shaped polyamide structures from lactams.

It is known that lactams can be polymerized at temperatures over 200° C. in the presence of alkaline catalysts. It furthermore is known that the velocity of the polymerization can be increased by the use of suitable co-catalysts so that the polymerization proceeds rapidly even at considerably lower temperatures. This renders it possible to produce shaped polyamide structures by polymerization of the corresponding lactam directly in the casting molds at temperatures below the melting point of the polyamide. The resulting polymers are relatively brittle in the dry state and as a consequence it was previously necessary to treat the polyamide structures thus produced with hot water as they only assume the desired toughness upon absorption of water.

This necessary condition of the polyamide structures is rather time consuming. The absorption of water is rather slow so that when thick walled parts are concerned a conditioning treatment lasting several months is required. As such water treated parts contain more water in the outer layers than in the interior, their exterior is tougher than the interior and require several months' storage in air to effect an equalization of the water concentration. As a consequence, a rapid absorption of water by the polyamides and a rapid achievement of the water distribution equilibrium are of great significance.

The object of the present invention is the direct production of tough shaped polyamide structures in which an aftertreatment to improve the toughness is not necessarily required.

According to the invention it was found that polyamide structures of nicreased toughness can be obtained by polymerizing melted monomeric lactams in the presence of known alkaline catalyst and known activators together with tertiary acid amides, dialkyl sulfoxides, dialkyl sulfones or mixtures thereof while shaping such masses during the polymerization.

The process according to the invention is suited for the homo- as well as co-polymerization of linear or branched monomeric lactams with more than six ring members, such as, for example, ε-caprolactam, C-methyl ε-caprolactam, ω-capryllactam and ω-lauryllactam.

The tertiary acid amides which can be employed according to the invention are tertiary aliphatic or aromatic carboxylic acid amides or aromatic sulfonic acid amides of the formula

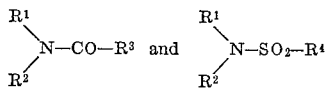

wherein $R^1$ and $R^2$ are alkyl or aryl radicals, $R^3$ is alkyl, aralkyl, aryl and alkaryl or hydrogen and $R^4$ is aryl or alkaryl. Preferably, such alkyl, aralkyl and alkaryl groups are lower alkyl, aryl (lower) alkyl and lower alkaryl groups, the aryl groups preferably being phenyl. Especially suited carbonamides or sulfonamides are: dimethyl formamide, diethyl formamide, N,N-dimethyl acetamide, N,N-dimethyl benzamide and N,N-dimethyl-p-toluene sulfonamide.

The dialkyl sulfoxides and dialkyl sulfones which can be employed according to the invention preferably are the dilower alkyl sulfoxides and the dilower alkyl sulfones. Dimethyl sulfoxide and dimethyl sulfone have proved especially advantageous.

The tertiary acid amides, dialkyl sulfoxides and dialkyl sulfones employed according to the invention do not have any inhibiting action on the polymerization. The quantities of such compounds employed amount to 1 to 20%, preferably, 3–7%, by weight of the final product.

The polymerization is effected in a temperature range the lower limit of which is above the melting point of the lactams employed and the upper limit is just below the melting point of the polyamide produced. Expediently, temperatures between 80 and 200° C. and preferably between 100 and 130° C. are used.

The known alkali metals and alkaline earth metals, as well as their basic compounds, can be used as the alkaline catalysts. The following compounds, as also is already known, are, for example, suited as co-catalysts: acid halides, such as benzoyl chloride and terephthalic acid chloride; urea derivatives, such as bis-caprolactam-N-carbamido-1,6-hexane; guanidine derivatives, such as N,N',N''-triphenyl-guanidine; derivatives of cyanamide such as N-phenyl-N-methyl-cyanamide; derivatives of carbamic acid such as 1,6-hexamethylene-N-N'-bis-ethyl-urethane; derivatives of cyanamide; derivatives of carbamic acid; isocyanates, such as butyl isocyanate, hexyl isocyanate, octyl isocyanate, phenyl isocyanate, hexamethylene diisocyanate; carbodiimides, such as diisopropylcarbodiimide, dibutylcarbodiimide, dioctylcarbodiimide; and N,N-diacylamines, such as N-acetyl-ε-caprolactam.

The advantage of the polymerized product obtained according to the invention resides in that they can be used directly without a conditioning treatment. Their toughness can be varied within a wide range and can be adapted to the intended use. It is possible with the process according to the invention to cast around metal parts without occurrence of cracks because of shrinkage or during subsequent mechanical processing. It is also possible, if there is a necessity therefor, for example, for physiological reasons, to condition the shaped polyamide products produced according to the invention for a short time. In this case the advantage of the process is that the conditioning period is substantially shorter than the previously required conditioning times.

As already indicated, the polyamide parts produced according to the invention have an improved toughness, that is, a minimum toughness of at least 8 cm. kg./cm.² (measured according to DIN 53453, Dynstat apparatus D 20).

It is already known that sulfonic acid amides may be used in the production of linear polyamides by condensation of diamines and dicarboxylic acids at temperatures Furthermore, it also is known that carboxylic acid amides may be employed as regulators in the alkaline polymerization of lactams in the presence of alkaline catalysts but in the absence of co-catalysts. However, both of such processes are not technically acceptable for the direct production of shaped parts and the costly round about way over polyamide granulates and extrusion or injection molding is necessary for the production of shaped structures.

The following examples will serve to illustrate the process according to the invention with reference to several specific embodiments thereof. The proportions are given in parts or percent by weight unless otherwise specified. The values given for impact resistance were measured according to DIN 53453 with Dynstat apparatus D 20.

*Example 1*

(a) 85 parts of pure water free ε-caprolactam were melted together with 5 parts of bis-(caprolactam-N-carbamido)-1,6-hexane and 10 parts of pure dimethyl formamide added thereto. The temperature of the melt was raised to 110° C. A second mixture was prepared from 97.5 parts of pure water free caprolactam and 2.5 parts of sodium caprolactam and also heated to 110° C. Both mixtures were then united, stirred well and introduced into molds whose temperature was about 150° C. The mass hardened after a few minutes.

(b) The procedure of Example 1(a) was repeated except that 14 parts of dimethyl formamide were used instead of 10 parts.

(c) The procedure of Example 1(a) was repeated using 10 parts of dimethyl sulfoxide instead of the dimethyl formamide.

(d) The procedure of Example 1(a) was repeated using 14 parts of dimethyl sulfoxide instead of the dimethyl formamide.

The following table indicates the manner the toughness and hardness of the thus prepared nylon-6 is altered by the presence of dimethyl formamide and dimethyl sulfoxide.

| Plasticizer: | Impact resistance, kg. cm./cm.² |
|---|---|
| Dimethyl formamide (5%) | 10 |
| Dimethyl formamide (7%) | 15 |
| Dimethyl sulfoxide (5%) | 30 |
| Dimethyl sulfoxide (7%) | 30 |

*Example 2*

The polymerization was carried out as in Example 1(a) except that instead of dimethyl formamide, 7% of diethyl formamide, 7% of dimethyl acetamide and 10% of dimethyl benzamide were used respectively. The impact resistance of the products is indicated in the following table.

| Plasticizer: | Impact resistance, kg. cm./cm.² |
|---|---|
| Diethyl formamide (7%) | 11 |
| Dimethyl acetamide (7%) | 13 |
| Dimethyl benzamide (10%) | 8 |

*Example 3*

Analogously to Example 1(a), compositions containing

| | Parts |
|---|---|
| Bis-(caprolactam-N-carbamido)-1,6-hexane | 5.0 |
| Na-caprolactam | 2.5 |
| Methylene-bis-caprolactam (cross-linking agent) | 4.0 |
| Capryllactam | 20.0 |
| ε-Caprolactam | 168.0 | to which respectively 5% of N,N-dimethyl-p-toluene-sulfonamide, 5% of dimethyl formamide, 5% of dimethyl acetamide and 5% of dimethyl sulfoxide had been added were prepared at 105–110° C. and polymerized in molds.

The following table gives the impact resistance of the respective products.

| Plasticizer: | Impact resistance, kg. cm./cm.² |
|---|---|
| N,N-dimethyl-p-toluene sulfonamide (5%) | 11 |
| Dimethyl formamide (5%) | 23 |
| Dimethyl acetamide (5%) | 25 |
| Dimethyl sulfoxide (5%) | No break |

*Example 4*

(a) Analogously to Example 1(a), compositions containing

| | Parts |
|---|---|
| ε-Caprolactam | 130.5 |
| Capryllactam | 50.0 |
| Methylene-bis-caprolactam | 4.0 |
| Na-caprolactam | 2.5 |
| Bis-(caprolactam-N-carbamido)-1,6-hexane | 3.0 | to which respectively 10 parts of dimethyl sulfoxide and 10 parts of dimethyl sulfone had been added were prepared at 100° C. and polymerized in molds heated to 150° C. The impact resistance of both products was such that no brake occurred. The impact resistance of the polymer without dimethyl sulfoxide or dimethyl sulfone is 6 cm. kg./cm.².

(b) The procedure of Example 5(a) was repeated with the dimethyl sulfoxide except that the 50 parts of capryllactam were replaced by 50 parts of lauryllactam. The impact resistance of such product was such that no break occurred. The impact resistance of the polymer without dimethyl sulfoxide is 6 cm. kg./cm.².

We claim:

1. In a process for the direct production of shaped polyamide structures by the polymerization of at least one lactam of at·least 7 ring members in fused state but at a temperature below the melting point of the polyamide produced between 80 and 200° C. in the presence of an alkaline catalyst and an activator in a mold, the steps of incorporating at least one material selected from the group consisting of tertiary carboxylic acid amides of the formula

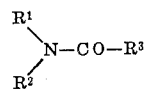

tertiary sulfonic acid amides of the formula

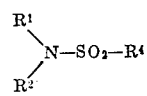

dilower alkyl sulfoxides and dilower alkyl sulfones wherein $R^1$ and $R^2$ are selected from the group consisting of lower alkyl and phenyl, $R^3$ is selected from the group consisting of hydrogen, lower alkyl and phenyl lower alkyl, and $R^4$ is selected from the group consisting of phenyl and lower alkyl phenyl, in the composition to be polymerized and polymerizing such composition containing said material, the amount of said incorporated material being 1 to 20% by weight with respect to the monomeric lactam contained in the composition and being effective to increase the impact resistance of the polymerized product substantially to at least 8 cm. kg./cm.².

2. The process of claim 1 in which the polymerization is effected at a temperature between 100 and 130° C.

3. The process of claim 1 in which a tertiary acid amide selected from the group consisting of dimethyl formamide, diethyl formamide, N,N-dimethyl acetamide, N,N-dimethyl benzamide and N,N-dimethyl-p-toluene sulfonamide is employed.

4. The process of claim 1 in which dimethyl sulfoxide is employed.

5. The process of claim 1 in which dimethyl sulfone is employed.

References Cited

UNITED STATES PATENTS

| 017,391 | 1/1962 | Mottus et al. | 260—78 |
| 3,017,391 | 1/1962 | Mottus et al. | 260—78 |
| 3,094,502 | 6/1963 | Farago | 260—30.8 |
| 3,138,574 | 6/1964 | Kohan | 260—78 |
| 3,239,490 | 3/1966 | Gee et al. | 260—78 |

FOREIGN PATENTS 561,702  6/1944  Great Britain.

WILLIAM H. SHORT, *Primary Examiner.*

H. D. ANDERSON, *Assistant Examiner.*